US006739512B2

(12) United States Patent
Guerrero et al.

(10) Patent No.: US 6,739,512 B2
(45) Date of Patent: May 25, 2004

(54) SYSTEM AND METHOD FOR TRACKING A COMPONENT IN A NETWORK ENVIRONMENT

(75) Inventors: Michael Louis Guerrero, Orlando, FL (US); Antonio Augusto Soares, Winter Springs, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 20 days.

(21) Appl. No.: 10/218,715

(22) Filed: Aug. 14, 2002

(65) Prior Publication Data

US 2003/0094493 A1 May 22, 2003

Related U.S. Application Data

(60) Provisional application No. 60/332,136, filed on Nov. 16, 2001.

(51) Int. Cl.[7] .................................................. G06K 7/10
(52) U.S. Cl. .................. 235/462.01; 235/375; 235/376; 235/385; 235/462.14; 235/472.01; 705/95; 705/96; 705/97
(58) Field of Search ................................. 235/375, 376, 235/385, 462.01, 494, 462.14, 472.1; 700/95, 96, 97, 99, 115

(56) References Cited

U.S. PATENT DOCUMENTS

| 4,700,309 A | * | 10/1987 | Naito et al. ................. 700/115 |
| 5,231,585 A | * | 7/1993 | Kobayashi et al. ............ 700/96 |
| 6,138,104 A | * | 10/2000 | Marchak et al. ............... 705/9 |
| 6,249,714 B1 | * | 6/2001 | Hocaoglu et al. ............. 700/97 |
| 6,321,983 B1 | * | 11/2001 | Katayanagi et al. ......... 235/380 |

* cited by examiner

Primary Examiner—Michael G. Lee
Assistant Examiner—Steven S. Paik

(57) ABSTRACT

A method for use in managing manufacturing of a virtual factory includes receiving at a management location, for a plurality of respective particular components, a request over a network for a serial number to be used in identifying the particular component. The method also includes, for each respective particular component, in response to the request, determining a serial number for the particular component and for each of a plurality of independent manufacturing entities, independent from each other and the management location, that operate on the particular component, receiving and storing at the management location from the manufacturing entity, over the network, data indicative of a scanned bumpy bar code affixed on the particular component and data indicating a status of manufacture for the particular component, the scanned bumpy bar code signal being indicative of the determined serial number.

43 Claims, 11 Drawing Sheets

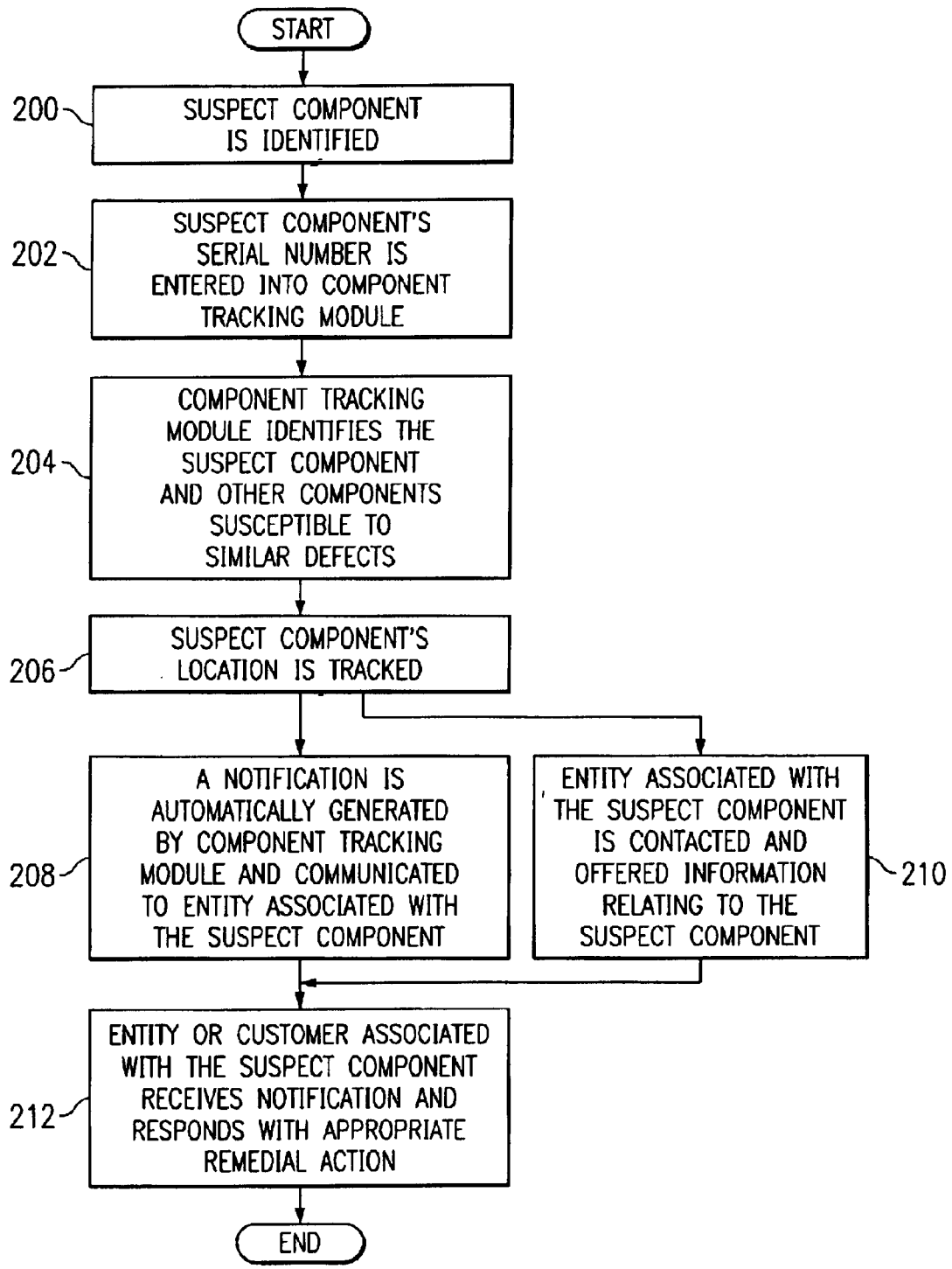

50

| | | | |
|---|---|---|---|
| H | G | O | 1234 |

| MFG | MONTH MFG | YEAR MFG | SEQUENTIAL SERIAL NUMBER |
|---|---|---|---|
| A-DIA PRECISION | A-JAN | 0-2000 | |
| C-DERITEND PRECISION | B-FEB | 1-2001 | |
| D-HOWMET DOVER | C-MAR | 2-2002 | |
| E-HOWMET EXETER | D-APR | 3-2003 | |
| G-GRAY SYRACUSE | E-MAY | 4-2004 | |
| H-HOWMET HAMPTON | F-JUNE | 5-2005 | |
| L-ROLLS ROYCE | G-JULY | 6-2006 | |
| P-PCC MINERVA | H-AUG | 7-2007 | |
| M-PCC MENTOR | J-SEP | 8-2008 | |
| T-DONCASTERS TFB | K-OCT | 9-2009 | |
| U-UTICA | P-NOV | A-2010* | |
| | R-DEC | B-2011* | |

FIG. 4D

~Update Component Records~

PO Number: 4500198173  B/M Sub Number: 321
PO Item: 001  MDR: 333444555556
ECMI:

Component Rerouting

Status: Choose Status:  L51/SRA:  244b — Update / Exit
244a

Scan Components Below:

Check Records

Your Search Found 10 match(es)  244c

| Update? All: ☑ | Serial Number | Part Name | PO Number | PO Item | Style Number | B/M Sub Number | Received Date | Heat Number | Scrap | MDR | EC |
|---|---|---|---|---|---|---|---|---|---|---|---|
| ☑ | XG10001 | Turbine Blade Row 3 | | | 2245J93001 | 123 | 7/6/01 | | No | | |
| ☑ | XG10002 | Turbine Blade Row 3 | | | 2245J93001 | 123 | 7/6/01 | | No | | |
| ☑ | XG10003 | Turbine Blade Row 3 | | | 2245J93001 | 123 | 7/6/01 | | No | | |

FIG. 4E

~Update Component Records~

PO Number: ☐   B/M Sub Number: ☐

PO Item: ☐   MDR: ☐

ECMI: ☐

Heat Number: ☐

Component Rerouting

| Status: | Choose Status: ▼ | L51/SRA: | | Exit |
| 246a | | | 246b | Ship Parts |

Scan Components Below:

[                                ]   Check Records

Your Search Found 10 match(es)   246c

| Update? All: ☐ | Serial Number | Part Name | PO Number | PO Item | Style Number | B/M Sub Number | Received Date | Heat Number | Scrap | MD |
|---|---|---|---|---|---|---|---|---|---|---|
| ☑ | XG10001 | Turbine Blade Row 3 | 4500198173 | 001 | 2245J93001 | 321 | 7/6/01 | 1234 | No | 333 555 |
| ☑ | XG10002 | Turbine Blade Row 3 | 4500198173 | 001 | 2245J93001 | 321 | 7/6/01 | 1234 | No | 333 555 |
| ☐ | XG10003 | Turbine Blade Row 3 | 4500198173 | 001 | 2245J93001 | 321 | 7/6/01 | 1234 | No | 333 555 |

| Serial Number | Component Name | Supplier Name | PO Number & Item | Style Number | Date Received | Da Shi |
|---|---|---|---|---|---|---|
| HN00001 | | | | | | |
| | Vane Segment Row 1 | | | | | |
| | | Abc Corp. | 1123180030-099 | 8568X57X42 | 12/04/2000 | 12/ |
| | | Def Corp. | 1177180030-025 | 8568R57R40 | 12/14/2000 | 01/ |
| | | Xyz Corp. | 1152180030-061 | 8568C57C15 | 01/29/2001 | 05/ |
| | | Xxx Corp. | 1141180030-043 | 8568A57A38 | 07/05/2001 | |
| HN00002 | | | | | | |
| | Vane Segment Row 1 | | | | | |
| | | Abc Corp. | 1123180030-099 | 8568X57X42 | 12/04/2000 | 12/ |
| | | Def Corp. | 1177180030-025 | 8568R57R40 | 12/14/2000 | 01/ |
| | | Xyz Corp. | 1152180030-061 | 8568R57R40 | 01/29/2001 | 05/ |
| | | Xxx Corp. | 1141180030-043 | 8568A57A38 | 07/05/2001 | |
| HN00003 | | | | | | |
| | Vane Segment Row 1 | | | | | |
| | | Abc Corp. | 1123180030-099 | 8568X57X42 | 12/04/2000 | 12/ |
| | | Def Corp. | 1177180030-025 | 8568R57R40 | 12/14/2000 | 01/ |
| | | Xyz Corp. | 1152180030-061 | 8568R57R40 | 01/29/2001 | 05/ |
| | | Xxx Corp. | 1141180030-043 | 8568A57A38 | 07/05/2001 | |
| HN00004 | | | | | | |
| | Vane Segment Row 1 | | | | | |
| | | Abc Corp. | 1123180030-099 | 8568X57X42 | 12/04/2000 | 12/ |
| | | Def Corp. | 1177180030-025 | 8568R57R40 | 12/14/2000 | 01/ |
| | | Xyz Corp. | 1152180030-061 | 8568R57R40 | 01/29/2001 | 05/ |
| | | Xxx Corp. | 1141180030-043 | 8568A57A38 | 07/05/2001 | |

FIG. 4G

| Supplier | Component | Received Year | Received Date | Pieces Received | Ship Date | Pieces Shipped | Serial Numbers | End Inventory | Pieces Scrapped |
|---|---|---|---|---|---|---|---|---|---|
| ▷ MEYER TOOL | | | | 126 | | 78 | | 48 | 2 |
| ▷ MI Products Inc | | | | 10299 | | 67 | | 10232 | 6 |
| ▷ Mid-State Machine Products, Inc. | | | | 54 | | 23 | | 31 | 0 |
| ▷ Moeller Mfg. | | | | 2260 | | 1707 | | 553 | 25 |
| ▷ Multax Corp. | | | | 1837 | | 1504 | | 333 | 0 |
| | Turbine Blade Row 2 | | | 13 | | 13 | | 0 | 0 |
| | Vane Segment Row 1 | | | 468 | | 371 | | 97 | 0 |
| | | Not Rcvd | | 33 | | 0 | | 33 | 0 |
| | | 2001 | January | 8 | | 8 | | 0 | 0 |
| | | 2001 | February | 64 | | 64 | | 0 | 0 |
| | | 2001 | April | 32 | | 32 | | 0 | 0 |
| | | 2001 | May | 32 | | 32 | | 0 | 0 |
| | | 2001 | May | 59 | | 59 | | 0 | 0 |
| | | | | 4 | May | 4 | | 0 | 0 |
| | | | | 55 | June | 55 | | 0 | 0 |
| | | 2001 | | 17 | | 17 | | 0 | 0 |

249a

249

SYSTEM AND METHOD FOR TRACKING A COMPONENT IN A NETWORK ENVIRONMENT

RELATED APPLICATIONS

This application claims the priority under 35 U.S.C. §119 of provisional application Ser. No. 60/332,136 entitled: "The Use Of Bumpy Bar Codes & The Internet To Track SWPC Components" filed Nov. 16, 2001. In addition, this Application is related to U.S. patent application Ser. No. 10/218,720 filed Aug. 14, 2002, entitled "System and Method for Identifying a Defective Component in a Network Environment."

TECHNICAL FIELD OF THE INVENTION

This invention relates in general to information management, and more particularly to a system and method for tracking a component in a network environment.

BACKGROUND OF THE INVENTION

Effective information management is critical for the operation of successful companies, organizations, or other entities engaged in the practice of producing goods, staple items, or services. As new technologies have forged ahead, the goods, items, and services produced by these new technologies have equally grown increasingly complex. The highly-specific nature of many technological industries has only augmented this complexity, resulting in intricate processes involving multiple entities that generate a single product.

The involvement of multiple entities in producing a single product provides a daunting task in attempting to share information, integrate concepts, and collaborate on manufacturing projects. Because of the complexity of certain manufacturing processes, many systems could benefit greatly from enhanced information sharing or optimal communication flows, which may offer an opportunity for participants to exchange ideas in order to achieve operational excellence. Accordingly, the ability to effectively communicate information amongst parties involved in the manufacturing process is crucial in order to alleviate manufacturing problems, automate or consolidate manufacturing tasks, and lessen the negative effects of technological barriers that operate to squander valuable time and resources.

SUMMARY OF THE INVENTION

According to one embodiment of the present invention, a method for use in managing manufacturing of a virtual factory includes receiving at a management location, for a plurality of respective particular components, a request over a network for a serial number to be used in identifying the particular component. The method also includes, for each respective particular component, in response to the request, determining a serial number for the particular component and for each of a plurality of independent manufacturing entities, independent from each other and the management location, that operate on the particular component, receiving and storing at the management location from the manufacturing entity, over the network, data indicative of a scanned bumpy bar code affixed on the particular component and data indicating a status of manufacture for the particular component, the scanned bumpy bar code signal being indicative of the determined serial number.

Some embodiments of the present invention may provide a number of technical advantages. For example, according to one embodiment of the present invention a method for tracking a component is provided that includes a component tracking module that allows for the sharing of information amongst multiple entities. The component tracking module provides a communicative interface that offers collaborative opportunities for multiple entities engaged in the manufacturing process. The component tracking module also offers the benefit of an organized storage unit that significantly reduces the time and effort required to retrieve historical data relating to component manufacturing characteristics and their associated service records. This is due, in part, to the close scrutiny designated for each component as it traverses through the manufacturing process, from a casting step or stage to a final step or stage where it may be warehoused as inventory to be later implemented.

Another technical advantage of one embodiment of the present invention is a result of the bar code that is marked on each component, which is manufactured and that is tracked. The bar code provides an identification tag that allows for strict supervision of an associated component as it flows through the manufacturing process. The bar code also provides for a clear identification of a component, a feature that eliminates confusion or errors in data entry when attempting to identify a component.

The implementation of a bar-coding system further provides the capability for determining an exact location of a component sought to be tracked in a manufacturing environment. This may be particularly important in scenarios where a defect or an error is discovered in a component. In accordance with the teachings of the present invention, a bar-coding protocol is offered that identifies a precise location of the suspect component. The suspect component may then be recalled by a manufacturing entity or otherwise designated as scrap to be melted down at a suitable location. Alternatively, the location of the suspect component may be identified such that a customer may be contacted and informed about a potential inferior part or component. The identification capability may also provide a tool for identifying related components that may have similar defects. Related flaws or deficiencies may be recognized in the case where a batch or a group of components were manufactured at a single location or by a single piece of machinery for example. In this sense, potentially defective parts may be targeted, identified, and retrieved by an entity before a customer experiences a failure or a system breakdown as a result of the suspect component.

Yet another technical advantage of one embodiment of the present invention is a result of the component tracking module's ability to store and to organize information that relates to each individual component. For example, the component tracking module may catalogue material test reports associated with each component being manufactured. The test data may be provided to any interested party such that decisions regarding the implementation or the purchase of the component may be informed. In addition, such a protocol for storing component documentation (as provided by the component tracking module) eliminates the dependence on hard copy documentation, which burdens administrative resources and which provides a significant issue in cases where documents must be modified or updated.

Still another technical advantage of one embodiment of the present invention relates to the improved visibility of critical characteristics of a component. Because each component includes a bar code with an associated profile stored in the component tracking module, characteristics associated with the component (such as material properties, airflow, and moment) may be effectively organized and clearly displayed for access by manufacturing participants. This gives improved visibility to parties involved in the manufacturing process in that they may view specifications and parameters reflecting the performance and the overall integrity of the associated component. This in turn may allow for the selection of a product that matches the exact system, architecture, or problem that necessitates or requires the manufactured component.

Another technical advantage of one embodiment of the present invention is due to the architecture of the system, which provides both broad and detailed perspectives for identifying bottle necks or capacity parameters for each individual entity and for the manufacturing system as a whole. This may allow for the optimization of manufacturing schedules through the utilization of manufacturing resources. The data offered in accordance with the teachings of the present invention may suggest which entities are able to take on additional manufacturing tasks. In addition, this monitoring feature allows for the forecasting of production cycles. Additionally, negative performance trends may also be pinpointed and addressed, while areas of production strength may be identified and exploited in order to embrace future robust production activity.

Yet another technical advantage provided by one embodiment of the present invention relates to improved customer service. Clients or consumers may be properly informed and able to receive specific products, which may be designed and manufactured with designated parameters for distinct applications. In addition, the component tracking module allows for the automation of purchasing transactions. Other advantages of the present invention may include improved asset utilization, higher overall efficiency, and an increased ability to effectively penetrate new markets or create new products.

Embodiments of the present invention may enjoy some, all, or none of these advantages. Other technical advantages are readily apparent to one skilled in the art from the following figures, the description, and the claims.

BRIEF DESCRIPTION OF THE DRAWINGS

Reference is made to the following description taken in conjunction with the accompanying drawings in which:

FIG. 2 is a flowchart illustrating a series of steps associated with identifying a suspect component to be tracked by the system of FIG. 1 in accordance with one embodiment of the present invention;

FIG. 4D is a diagram of an example update form to be used in updating one or more parameters associated with the component to be tracked by the system of FIG. 1 in accordance with one embodiment of the present invention;

FIG. 4E is a diagram of an example shipping form for use in shipping a component to be tracked by the system of FIG. 1 in accordance with one embodiment of the present invention;

FIG. 4F is a diagram of an example defect form for tracking a component that has been identified as being defective within the system of FIG. 1A in accordance with one embodiment of the present invention;

FIG. 4G is a diagram of an example scrap designation form for tracking a component designated as scrap in the system of FIG. 1A in accordance with one embodiment of the present invention.

DETAILED DESCRIPTION OF EXAMPLE EMBODIMENTS OF THE INVENTION

Example embodiments of the invention are best understood by referring to FIGS. 1A through 5 of the drawings in which like numerals refer to like parts.

Figure 1A:
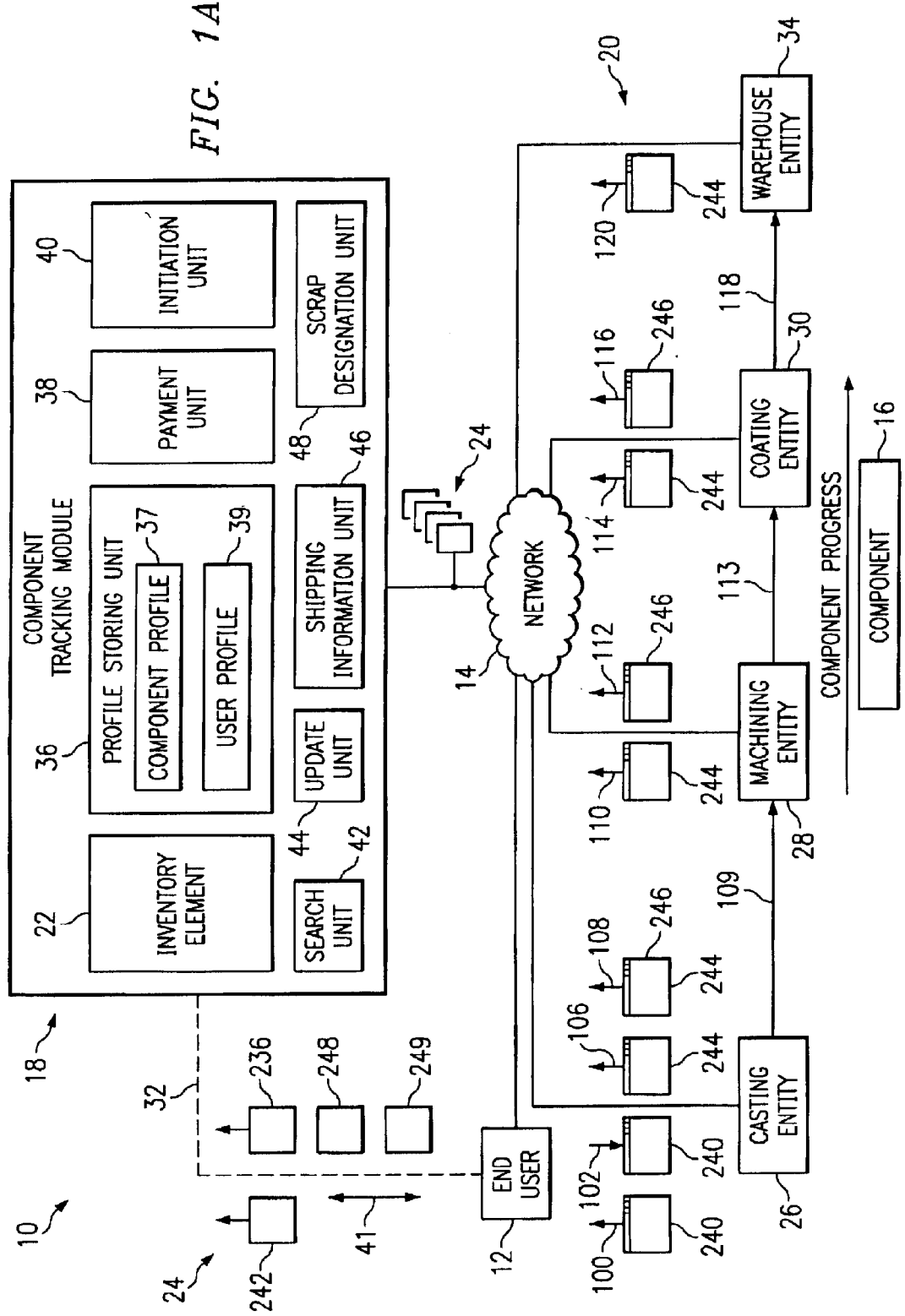
FIG. 1A is a simplified block diagram of a system for tracking a component in a network environment in accordance with one embodiment of the present invention.
Figure 1B:
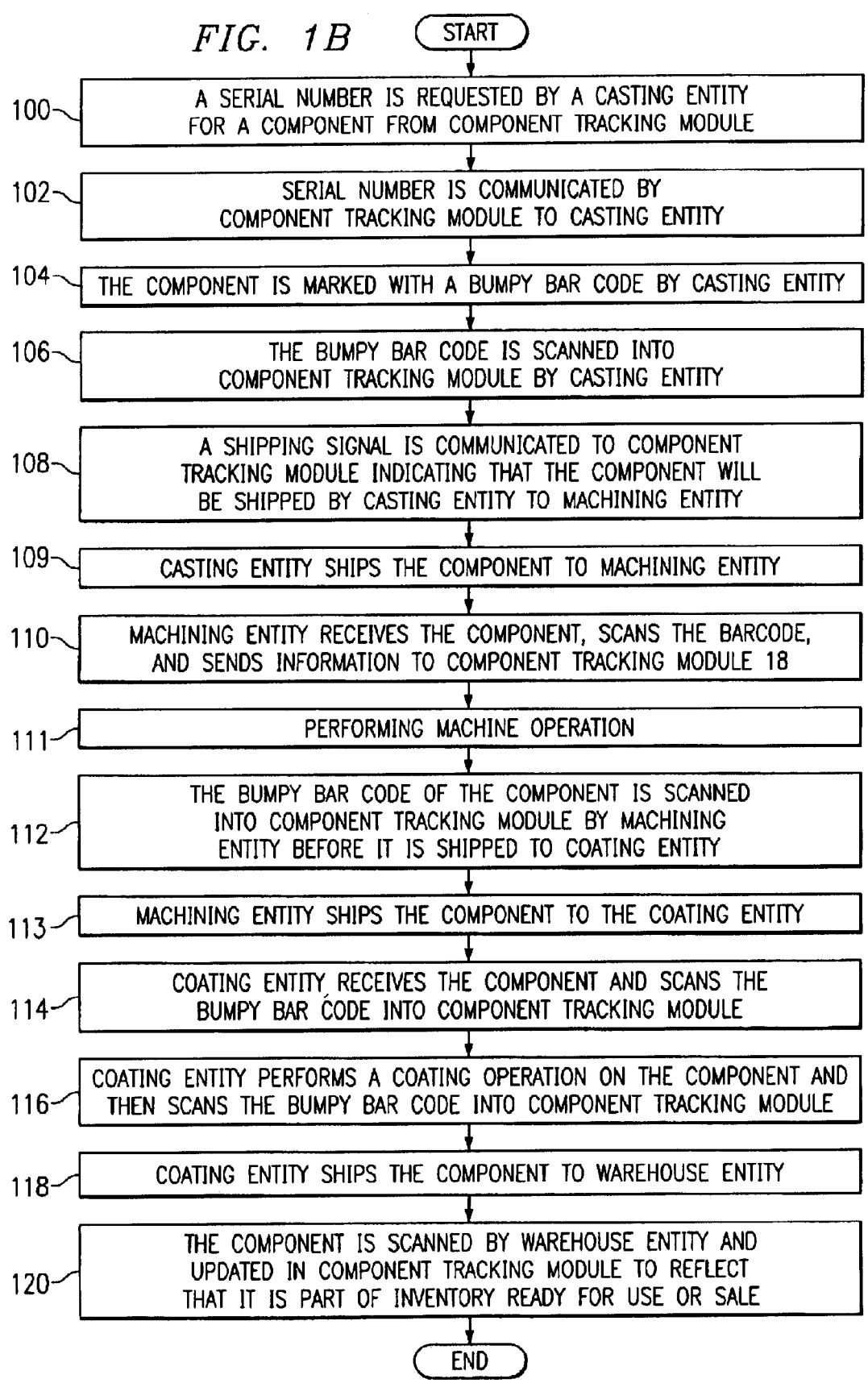
FIG. 1B is a flowchart illustrating a series of steps associated with a method for tracking a component in a network environment in accordance with one embodiment of the invention.

FIG. 1A is a simplified block diagram of a tracking system 10 for tracking a component 16 in a network environment in accordance with one embodiment of the present invention, and FIG. 1B is a flow chart showing operation of system 10. Tracking system 10 includes a component tracking module 18 in communication with a plurality of manufacturing entities 20 through a network 14. A user 12 may access computer tracking module 18 through network 14 or other suitable manner. Manufacturing entities 20 include, in this embodiment, a casting entity 26, a machining entity 28, a coating entity 30, and a warehouse entity 34. Casting entity 26, machining entity 28, coating entity 30, and warehouse entity 34 are entities involved in a manufacturing process that results in a completed component 16. Each of the entities may perform some operation on component 16 as it progressively advances through the manufacturing process being monitored by component tracking module 18 and are described in greater detail below.

According to the teachings of the invention, component 16 is marked with a bumpy bar code 50 (FIGS. 3A and 3C) at an initial stage of manufacture, and the progress of the manufacture of component 16 through the various stages of manufacture may be tracked through communication of bar code 50 in conjunction with status information by manufacturing entities 20 to component tracking module 18 through network 14. Such information may be communicated by use of a plurality of types of web pages or forms 24 transmitted between component tracking module 18 and manufacturing entities 20 as described in greater detail below. According to one particular embodiment of the invention each manufacturing entity 20 is independent of component tracking module 18, meaning that manufacturing entities 20 are operated by different companies than the operator of component tracking module 18. Thus the teachings of the invention provide a mechanism for management of a "virtual factory" by communicating information regarding a component's manufacture in association with a signal indicative of bumpy bar code 50 identifying component 16 to component tracking module 18.

Component tracking module 18 includes multiple functional units that offer various tools and features to be used in tracking a component through a manufacturing process. Component tracking module 18 comprises, in this example, an inventory element 22, a profile storing unit 36, a payment unit 38, an initiation unit 40, a search unit 42, an update unit 44, a shipping information unit 46, and a scrap designation unit 48. These functional units provide a myriad of features and capabilities for tracking system 10 to implement and are described in greater detail.

In operation, and with reference to FIGS. 1A and 1B, to initiate tracking of a component 16 casting entity 26 requests a serial number for component 16 from component tracking module 18 at step 100. This initialization operation is described in greater detail below with reference to FIG. 4A and may utilize an initiation form 240 (FIG. 4A). At step 102, the serial number is generated or otherwise selected by component tracking module 18 and communicated to casting entity 26. Component 16 is marked with bumpy bar code 50 at step 104. Bumpy bar code 50 includes indicia corresponding to the serial number received by casting entity 26.

At step 106, the bumpy bar code 50 is scanned by casting entity 26 and the corresponding serial number is entered into component tracking module 18 through use of update form 244 such that component tracking module 18 is updated to reflect the marking of component 16 with the bumpy bar code 50. This initial receipt of a serial number corresponding to scanning of the bumpy bar code 50 on component 16 generally indicates receipt of component 16 by the particular manufacturing entity 20 scanning the code 50. Bumpy bar code 50 provides an identity for component 16 such that information gathered during the manufacture and the use of component 16 may be stored as a component profile 37 within component tracking module 18. Additional details relating to the bumpy bar code are offered below with reference to FIG. 3A.

Once casting entity 26 completes its operations on component 16, a shipping signal is communicated by casting entity 26 to component tracking module 18 at step 108. The shipping signal indicates that the component will be shipped by casting entity 26 to, in this example, machining entity 28. The shipping signal may be transmitted through shipping form 246, or through other suitable methods. At step 109 casting entity 26 ships component 16 to machining entity 28. After receiving component 16, machining entity 28 may scan bar code 50 of component 16 and communicate such receipt to component tracking module 18 through update form 244 such that component tracking module 18 through update form 244 can release payment (or otherwise generate a suitable invoice) in order for casting entity 26 to be adequately compensated. Such communication may occur through use of form 240.

Machining entity 28 may perform some selected machining operation on component 16 at step 111. At step 112, bumpy bar code 50 of component 16 is scanned by machining entity 28 and information related to the status of manufacture of component 16 is communicated to component tracking module 18 such that component tracking module 18 is made aware of the progress of the manufacture of the component. This also makes component tracking module 18 aware of the shipping of the component from machining entity 28 to coating entity 30. Such communication may occur through transmission of form 246. At step 113 machining entity 28 ships component 16. At step 114, coating entity 30 receives the component, scans the bumpy bar code 50, and communicates such receipt to component tracking module 18. Such communication may occur through transmission of update form 244.

Coating entity 30 performs a suitable coating operation on the component at step 116 and then scans bumpy bar code 50 of component 16 and communicates status information such that component tracking module 18 is made aware of the progress of component 16. Such communication may be made by transmission of shipping form 246. Coating entity 30 may then ship component 16 to warehouse entity 34 at step 118. At step 120, component 16 may be scanned by warehouse entity 34 and the associated status updated in component tracking module 18 to reflect that component 16 is part of an inventory ready for potential use or sale. Such communication to component tracking module 18 may be made through use of update form 244. Additionally, payment may be released, or a suitable invoice generated, for coating entity 30 after the barcode of the component is properly scanned into component tracking module 18 by warehouse entity 34.

In addition, during the manufacturing process as illustrated in FIG. 1B, any one of entities 20 may communicate additional data associated with component 16 to component tracking module 18. The data may be stored in a corresponding component profile 37 within profile storing unit 36 included in component tracking module 18. The data may include test reports, performance data, or variances and specifications, for example, associated with the component. Fewer, additional, and/or different steps, arrangements, or operations of FIG. 1B may be made where appropriate without departing from the teachings of tracking system 10.

In this process of repeatedly scanning bumpy bar code 50, communicating associated status information to component tracking module 18 and then shipping the associated component 16, component tracking module 18 is able to monitor the manufacture of component 18 from a raw form to a finished product. The identity of the finished component 16 may be stored electronically within inventory element 22 where it is designated as 'complete' while the corresponding completed component may be physically stored at warehouse entity 34. Tracking system 10 may also record information or data that identifies the customer that purchased or otherwise received the finished component 16. Such information may be included in component tracking module 18 or any other suitable location where appropriate and according to particular needs.

Tracking system 10 may provide for optimal communications flow between participants in the manufacturing process by allowing access to important manufacturing data associated with each component. Such data may provide a clearer understanding or a more manageable approach to comprehending complex manufacturing processes. In addition, component tracking module 18 offers collaboration and integration opportunities for entities engaged in the manufacturing process. The use of component tracking module 18 also offers the benefit of an organized storage unit that significantly reduces the time and effort required to retrieve historical data relating to component manufacturing characteristics and associated service records. These features operate to provide a virtual factory within tracking system 10 that may integrate several distinct or independent entities associated with each other only through the manufacturing process. Accordingly, component tracking module 18 may operate to merge or to unify independent entities in order to offer a single global manufacturing platform that synthesizes the abilities of all participants in the manufacturing process at a central location.

Tracking system 10, in one embodiment, additionally offers the ability for all associated parameters of a corresponding component 16 to be provided to component tracking module 18 before shipping is initiated. This scrutinizing feature allows for close control and supervision of component 16 by component tracking module 18, which may in turn offer this information for access by any participants in the manufacturing enterprise. This further allows for production evaluations by casting entity 26, machining entity 28, coating entity 30, and warehouse entity 34 on a component-by-component basis. Tracking system 10 further provides a number of other benefits such as improved customer service, increased efficiency, and enhanced asset allocation as described more fully below.

Additional details of components of FIG. 1A are now described. End user 12 is a user seeking to communicate with component tracking module 18, and may communicate via network 14. End user 12 may seek information relating to component 16 and ultimately purchase component 16 by invoking the use of component tracking module 18. End user 12 may also access component tracking module 18 in order to view historical data associated with a specific component that is stored in corresponding component profile 37, described in greater detail in conjunction with FIG. 5. End user 12 may also access component tracking module 18 directly, as illustrated by a dashed line 32, which may couple component tracking module 18 to end user 12. Each end user 12 may be assigned a unique identification and password and have an associated user profile 39 stored in component tracking module 18. User profile 39 may include information about previous orders as well as account balances and other associated end user information where appropriate.

In a particular embodiment of the present invention, end user 12 represents a potential customer wishing to purchase a component 16 using a computer to initiate communications with component tracking module 18. Alternatively, end user 12 may be any other suitable entity or element seeking to utilize tracking system 10 in order to purchase or to glean information about a component. For example, end user 12 may be a database or a program capable of facilitating data exchanges between two or more nodes in a network environment. In addition, end user 12 may utilize any suitable device in order to communicate with component tracking module 18, such as: a personal digital assistant (PDA), a laptop or an electronic notebook, a computer designed specifically for interfacing with component tracking module 18, a cellular telephone, a wireless element, or any other element, computer, device, component, or object capable of initiating voice or data exchanges within tracking system 10. Multiple end users 12 (not explicitly shown) may be coupled to network 14 and may initiate a communication with component tracking module 18 via network 14.

In an example operation, end user 12 may wish to initiate a communication with component tracking module 18 in order to identify one or more parameters associated with a component 16 to be purchased or to be evaluated by end user 12. For example, end user 12 may seek a specific turbine component to be used in a designated system requiring precise specifications or variances in order to comply with corresponding architectural requirements. End user 12 may access component tracking module 18 in order to review one or more component profiles 37 within component tracking module 18 such that end user 12 may determine which component 16 is best suited according to particular needs. Component profiles 37 may include performance characteristics, test reports, service or repair histories in cases where the component has been implemented, and manufacturing processes used to produce component 16. This information-retrieval feature is illustrated in FIG. 1 by reference numeral 41, whereby end user 12 accesses various components of component tracking module 18 through use of some of the forms 24. Forms 24 include a search form 242 for communicating with search unit 42, a material test report form 236 for communicating with profile storing unit 36, a detect form 248 for communicating with scrap designation unit 48 regarding dockets in components 16, and a scrap designation form 249 for communicating with scrap designation unit 48 regarding scrap designations. Other forms 24 include an initiative form 240 for communicating with initiation unit 40, an update form 242 for communicating with update unit 44, and a shipping form for communicating with shipping information unit 46. Although particular forms 24 are illustrated to facilitate communication between user 12 and entities 20 with component tracking module 18, other forms of communication may be alternatively utilized, including simple email communication. Suitable information may be exchanged between end user 12 and component tracking module 18 such that end user 12 garners some insight into or otherwise gleans some information about a component 16 being tracked by tracking system 10.

Network 14 may offer a communications interface between component tracking module 18 and other elements of FIG. 1A, such as casting entity 26, machining entity 28, coating entity 30, or warehouse entity 34, for example. Network 14 may be any local area network (LAN), metropolitan area network (MAN), wide area network (WAN), or any other appropriate communications architecture that facilitates communications in a network environment. In one particular embodiment, network 14 implements a transmission control protocol/internet protocol (TCP/IP) communications language protocol; however, network 14 may alternatively implement any other suitable communication protocol for transmitting and receiving data packets within tracking system 10, such as asynchronous transfer mode (ATM), frame relay, and X.25, for example. Network 14 may alternatively be a virtual private network (VPN), coupling end user 12 to component tracking module 18 and further providing end user 12 with access to the world wide web.

As described above, component tracking module 18 tracks components 16 manufactured by manufacturing entities 20. In one embodiment, component tracking module 18 comprises a computer having a processor, associated memory and storage, an input device such as a keyboard or a mouse, and an output device such as a monitor or printer. Such an embodiment is described in greater detail below in conjunction with FIG. 1C. Component tracking module 18 offers information sharing at a central location, allowing casting entity 26, machining entity 28, coating entity 30, and warehouse entity 34 to share information about a component as it proceeds through a manufacturing process. In a particular embodiment of the present invention, component tracking module 18 may be represented by a plurality of functional units for tracking a component within tracking system 10 shown in FIG. 1A. Alternatively, component tracking module 18 may be any suitable element operable to track a component through the manufacturing process and further may include some, all, none, or different functional capabilities as those illustrated in FIG. 1. Component tracking module 18 may include any hardware, software, element, or object operable to facilitate communication flows in tracking system 10.

As described above, user 12 may obtain a variety of types of information regarding the manufacture of a component by manufacturing entities 20. Component tracking module 18 provides an interface between end user 12 and data stored within component tracking module 18 for doing so. Component tracking module 18 may offer an informational tool for end user 12 that is easy to navigate and that offers on-line help and data security functions where appropriate. Component tracking module 18 may be designed to allow one or more end users 12 to develop customized views and/or reports to manage the manufacture of one or more components. Component tracking module 18 may also be used to interface with commercial entities, such as casting entity 26, machining entity 28, coating entity 30, and warehouse entity 34 in order to post goods receipts, pay invoices, generate purchase orders, and update and maintain inventory accounts automatically.

Component tracking module 18 includes inventory element 22 in a particular embodiment of the present invention. Alternatively, inventory element 22 may be positioned external to component tracking module 18. Inventory element 22 stores the serial numbers associated with bar codes for corresponding components that have completed the manufacturing process. Inventory element 22 may store bar codes of components that are ready to be sold or otherwise used in the environment for which they were intended. Inventory element 22 may include any hardware, software, element, or object operable to store information about one or more components to be tracked by tracking system 10. Inventory element 22 may also provide an on-line network listing of completed components in a catalog format. The catalog may provide component descriptions, specifications, and test data such that a client or a customer (such as end user 12 for example) may clearly view critical information associated with each completed component stored in inventory element 22.

Profile storing unit 36 stores a profile 37 for each component 16 based on received information from manufacturing entities 20. The component profile 37 may be stored electronically in component tracking module 18 or physically in a suitable manner such that information relating to a component being tracked by tracking system 10 may be appropriately accessed or otherwise communicated.

The documentation within tracking system 10 may be suitably categorized and provide information as to (for example) which parts were cast in certain heating chambers or containers, or what types of material were used in the casting of the component. For example, a large vat of molten steel may operate as a starting point for casting entity 26. The vat generally has a heat number associated with it. In addition, the number of blades to be retrieved from the vat may be identified. This would allow a person to forecast that 100 pieces or 100 components may be produced from a single vat with a designated heat number. Accordingly, for a set of serial numbers, such as 0–100, the designation may be entered into component tracking module 18 reflect a heat number associated with the group of serial numbers. This documentation may be stored in component tracking module 18 and accessed by any unit within tracking system 10. This documentation provides a linking function for components related by this step in the manufacturing process. Accordingly, components may be tracked as stemming from the same vat, and additionally material reports may be further obtained that are associated with a component created from that vat. For example, a certain vat of steel is associated with a set of 100 components. This may be implemented in the context of a recall, where one component fails and it may be reasonably suspected that others originating from the same vat may also fail. This recalling ability allows the history of a defective part to be discovered and tracked in order to identify other potentially defective components.

Payment unit 38 receives information from user 12, entities 20, and other portions of component tracking module and may utilize that information to determine whether payment should be made to a particular entity 20. For example, payment may be withheld until a subsequent entity 20 scans the associated bar code 50 of a component 16 and such information is received by component tracking module 18 through update form 244, even though shipping for 246 indicates that component 16 was shipped.

As components propagate through the manufacturing process and between entities, purchase orders may be systematically generated. These purchase orders may be communicated electronically or released, printed, and sent by tracking system 10 to each participant or person entitled to payment. Purchase orders may generally be released after the component's bar code has been properly scanned by the receiving entity such that a match is found in the bar codes included in the shipping signal and those scanned in by the receiving entity. A problem may exist in traditional payment schemes between entities because of a lack of organization in the way in which components are shipped and received. For example, a problem may occur where supplier A (such as machining entity 28) has already been paid but supplier B (such as coating entity 30) contends that he only received nine of the ten pieces he was due. Because no confirmation was made upon receiving the nine components before releasing payment (i.e. no bar code scanning), an issue arises. In accordance with the teachings of the present invention, supplier A may scan 100 components and ship them, whereby components tracking module 18 indicates to the internal billing (such as an SAP billing system) that supplier A has shipped these parts. When supplier B receives the appropriate components, he may scan the components into component tracking module 18. A signal may then be sent to supplier A based on all 100 pieces being received. The signal may also include a direction to move the 100 pieces of inventory from supplier A to supplier B in component tracking module 18. After the pieces of inventory are moved from supplier A to supplier B, a suitable purchase order may be generated and issued by component tracking module 18 (or any other suitable entity) and supplier A accordingly paid.

Initiation unit 40 receives a request for a serial number, often from casting entity 26, such as request 100, and in response, generates a serial number and communicates the serial number to the requesting entity, as indicated by reference numeral 102. An example initiation form 240 that may be accessed by casting entity 26, for example, for making such a request is illustrated in FIG. 4A.

Figure 4B:
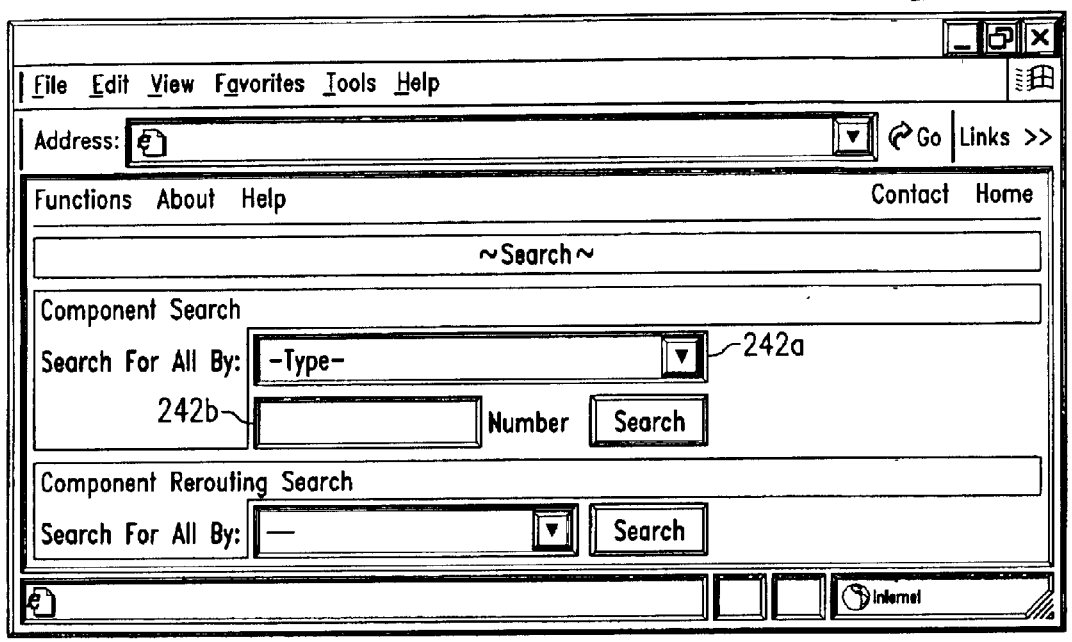
FIG. 4B is a diagram of an example search form for tracking a component within the system of FIG. 1 in accordance with one embodiment of the present invention.

Search unit 42 receives search requests from either user 12 or one of manufacturing entities 20 and in response generates search results. An example form 242 for performing such a search is illustrated in FIG. 4B.

Update unit 44 receives updated status information regarding the manufacture of a component 16 by manufacturing entities 20 and stores and organizes that information for use by other portions of component tracking module 18. An example update form 244 is illustrated in FIG. 4D.

Shipping information unit 46 receiving information regarding the shipping status of a component 16 and stores and organizes the information for use by other portions of component tracking module 18. An example shipping form is illustrated in FIG. 4E.

Scrap designation unit 48 enables tracking of scrap components 16 and ensuring that components 16 designated as scrap are destroyed and do not remain part of ordinary inventory.

Casting entity 26 is a person, an entity, a business, or an organization that operates to cast or to form a component 16 to be tracked within tracking system 10. In a particular embodiment of the present invention, casting entity 26 casts a turbine component of suitable material and initiates the tracking process. Alternatively, casting entity 26 may be any person, entity, organization, or business that produces a product to be tracked by tracking system 10. Casting entity 26 may communicate with initiation unit 40 of component tracking module 18 using, in one embodiment, a form such as form 240, described in greater detail in conjunction with FIG. 3 (and log-on where appropriate using a suitable unique identification and/or password) in order to receive a series of bar codes assigned by initiating unit 40 to be marked onto each individual component 16. This communication is represented by reference number 100 and the receipt of the serial number is represented by reference numeral 102. Casting entity 26 may then mark each respective component after the casting thereof and prior to shipping each component to a next destination. Casting entity 26 may scan each component marked by a bar code before shipping the component to machining entity 28. By scanning the associated component, casting entity 26 generates a signal to be communicated to component tracking module 18, as represented by reference numeral 106, that indicates the component has been cast and is ready for the next stage in the manufacturing process. Shipping information unit 46 of component tracking module 18 may then be updated in order to indicate that the component will be shipped from casting entity 26 to machining entity 28. The casted component 16 is then shipped to machining entity 28, as represented by reference numeral 109.

Machining entity 28 is a person, an entity, a business, or an organization that operates to further enhance component 16 after it is received from casting entity 26. In a particular embodiment of the present invention, machining entity 28 performs conventional machining on a turbine component received from casting entity 26. This may include, for example, cutting grooves or serrations into a turbine blade, or shaping a blade at one end of the component. Once machining entity 28 receives the component, it may scan the bar code of the component in order to communicate a signal to component tracking module 18, the signal indicating that component 16 has been received.

Alternatively, machining entity 28 may provide any suitable operation or enhancement to component 16 shipped by casting entity 26. Once component 16 is scanned by machining entity 28, component tracking module 18 is then updated accordingly (step 110). At the completion of the performed operation, machining entity 28 may scan the bar codes of the associated components 16 before shipping the components to coating entity 30. In scanning components 16 before shipping to a next destination, machining entity 28 communicates a signal to component tracking module 18 that the component will be shipped (step 112).

Coating entity 30 is a person, an entity, a business, or an organization that provides a coating or a finishing operation to component 16. In accordance with a particular embodiment of the present invention, coating entity 30 may deposit a ceramic coating to a turbine component, providing a layer or a shield of protection to the associated component 16. Alternatively, coating entity 30 may be any entity that provides some enhancement to the component after it is received from machining entity 28. Each of the entities, such as coating entity 30 for example, may also operate to scan any variances or to perform any parameter checks or performance tests on the component before choosing to ship the component to a next destination (step 118), such as warehouse entity 34 for a potential final sale in the case of coating entity 30. A number of example tests and component profile characteristics are provided below for example purposes in accordance with the teachings of the present invention.

Warehouse entity 34 is a person, an entity, a business, or an organization that stores completed parts tracked by tracking system 10. Warehouse entity 34 may receive a component 16 from coating entity 30 and scan the bar code 50 of that component 16 such that component tracking module 18 receives a signal indicating the presence of the component within warehouse entity 34. In addition, upon completion of component 16, the status of the component may be updated to reflect a finished product designation, as indicated by reference numeral 120, where the identity of component 16 is stored in inventory element 22. Inventory element 22 may reflect components 16 that are ready for sale or otherwise suitable for implementation in a designated system.

Warehouse entity 34 may also store the component and wait for a request for component 16 to be included in the assembly of a suitable turbine engine or a system requiring the component. The components 16 may be shipped from warehouse entity 34 to a next entity for suitable assembly, or shipped directly to a customer or client where appropriate. In accordance with a particular embodiment of the present invention, a turbine component may be manufactured and put in a combustion engine or a gas turbine engine for a power plant application. The turbine component may be assembled into a rotor and the corresponding blades shipped to an auxiliary entity for assembly before being shipped to the customer.

A number of operations may be performed on the component as it travels through the manufacturing process between machining entity 28 and coating entity 30. It is critical to note that FIGS. 1A and 1B are offered only for purposes of teaching of the present invention, a number of other suitable processing steps may be substituted therein between any two entities or further added as supplemental processes to be executed on a component being tracked by tracking system 10. For example, the component may receive electro-chemical machining (ECM), electro-discharge machining (EDM), or other suitable processing, buffing, or component-enhancing operations that further modify or change the associated component.

Additionally, in a particular embodiment of the present invention where the component is manufactured and implemented in a turbine system, the turbine component may receive further processing of the blade in cases where the unit is oversized or where the component is being specifically designed to fit a designated system. An additional machining entity 28 may be employed to grind down or otherwise cut a series of tips off the turbine component. In general, variances in the manufacture of turbine components should be approximately within ⅛ inches of the designated system specification. Other machine processes may be implemented on the turbine component in order to form cooling holes in the component or to form serpentine paths for cooling turbine blades. As described above, after each suitable machining process is performed on each of components 16, the corresponding bar code 50 of component 16 may be scanned before shipping component 16 to a next destination.

Each of the participants in tracking system 10 may be afforded considerable flexibility in how they interact with component tracking module 18. For example, any one of casting entity 26, machining entity 28, coating entity 30, and warehouse entity 34, may each be afforded several options when inputting information about an associated component 16. Each entity may create serial records, material test reports, or any other suitable report. Each entity may also update serial records, view records not received, or view records not shipped. Any one of casting entity 26, machining entity 28, coating entity 30, or warehouse entity 34 may also choose to stop shipment or to otherwise reject components that are not within designated specifications. Additionally, component tracking module 18 may be capable of electing to prohibit the shipment of components that do not comply with designated performance standards. For example, coating entity 30 may discover that some components are within compliance of certain specifications but that other variances are too great to be useful in intended operations. Coating entity 30 may then send a signal (not explicitly shown) to component tracking module 18 that informs a shipping entity to halt shipment of the inadequate components. In more egregious cases involving problematic components, this identification may allow for defective components to be designated as scrap during any stage in the manufacturing process, as described in greater detail below. A component 16 designated for scrap may be tracked by tracking system 10 until the suspect component 16 is suitably repaired or otherwise returned to a location where it may be melted down, returning component 16 to a raw material form.

Component tracking module 18 may also be used to track the inventory value of the component as manufacturing operations are completed thereon and value is added to the component. Additionally, component tracking module 18 may provide the ability for mass updates of records and corresponding changes to any one of a series of parameters associated with a component.

Component tracking module 18 may also provide for planning synchronization in allowing for the joint design and execution of component production. Planning synchronization may include forecasting potential outputs for individual entities or replenishing raw materials needed for casting entity 26 to initiate the manufacturing process. In a particular embodiment of the present invention, component tracking module 18 also includes a series of profiles for each individual component as identified by a bar code marked on each component by casting entity 26. The bar code reflects an identity of the component and operates to track the component (as described in more detail below) as it propagates through the manufacturing process. Additional details relatively to the information stored in the component profile are provided below.

Component tracking module 18 may perform a database-like function in tracking all parts or components on a piece-by-piece basis such that a virtual factory is created where, as the material moves between different entities, all participants in the manufacturing process may be collaborating and communicating through a single node or central location, i.e., component tracking module 18. Component tracking module 18 provides cooperation amongst all participants in tracking system 10. Notifications such as "I shipped a hundred pieces," and "Yes, I have received each and every piece as matched by the corresponding bar code" may be communicated between entities such that parties are made aware of actions involving or effecting the component as it moves through the manufacturing process. Thus, in accordance with the teachings of the present invention, component tracking module 18 may provide for the creation of a global manufacturing platform, whereby multiple participants may meet, share information, integrate their efforts, and collaborate in order to optimally produce a component.

The information sharing and transparency features of component tracking module 18 allow for quick response times and early problem detection of suspect components or system inefficiencies. This is due, in part, to the direct and real-time accessibility of component tracking module 18. In addition, synchronized planning in the form of collaboration and forecasting may be executed based on data provided by component tracking module 18. Component tracking module 18 further allows for the optimization of capacity and improved customer service in producing components more quickly that meet or exceed customer expectations.

Figure 1C:
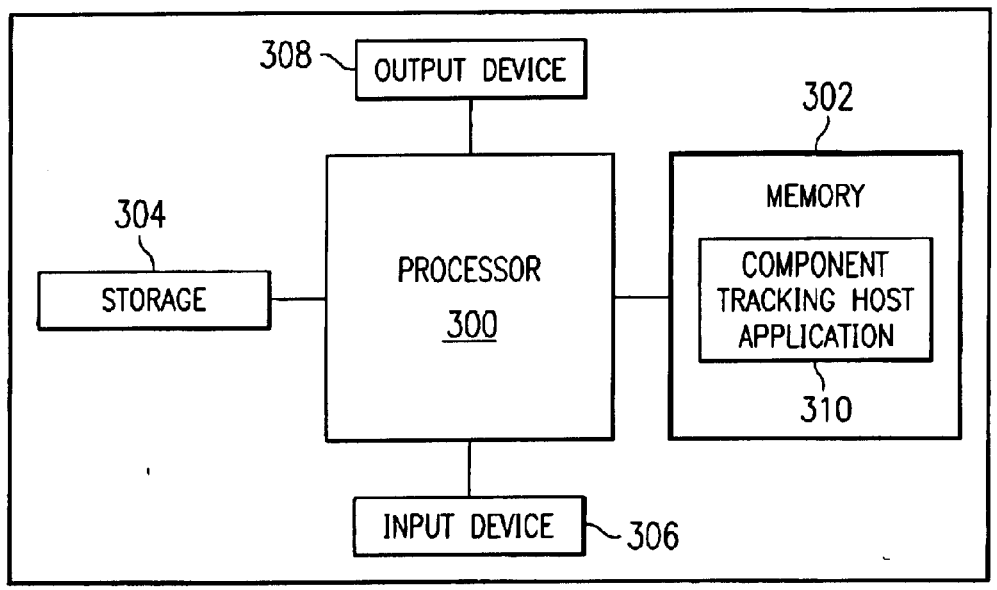
FIG. 1C is a block diagram of an example implementation of the component tracking module of FIG. 1A.

FIG. 1C is a block diagram of an example implementation of component tracking module 18. It will be understood that the physical implementation of component tracking module 18 may take many forms, such as a personal computer, a mainframe computer, or other types. In this example, component tracking module 18 includes a processor 300 associated with a computer-readable medium or memory 302. Associated with processor 300 may also be storage 304, an input device 306, and an output device 308. Memory 302 may comprise a floppy disk, a CD-ROM, flash memory, or other types of memory. Storage 304 may comprise hard disk storage, optical storage, or other types of storage. Input device 306 can take many suitable forms including a keyboard and a pointing device. Output device 308 may take many suitable forms including a display or a printer. A software program 310 that executes the functions of component tracking module 18 may be stored within either memory 302 or storage 304 for execution by processor 300.

Figure 1D:
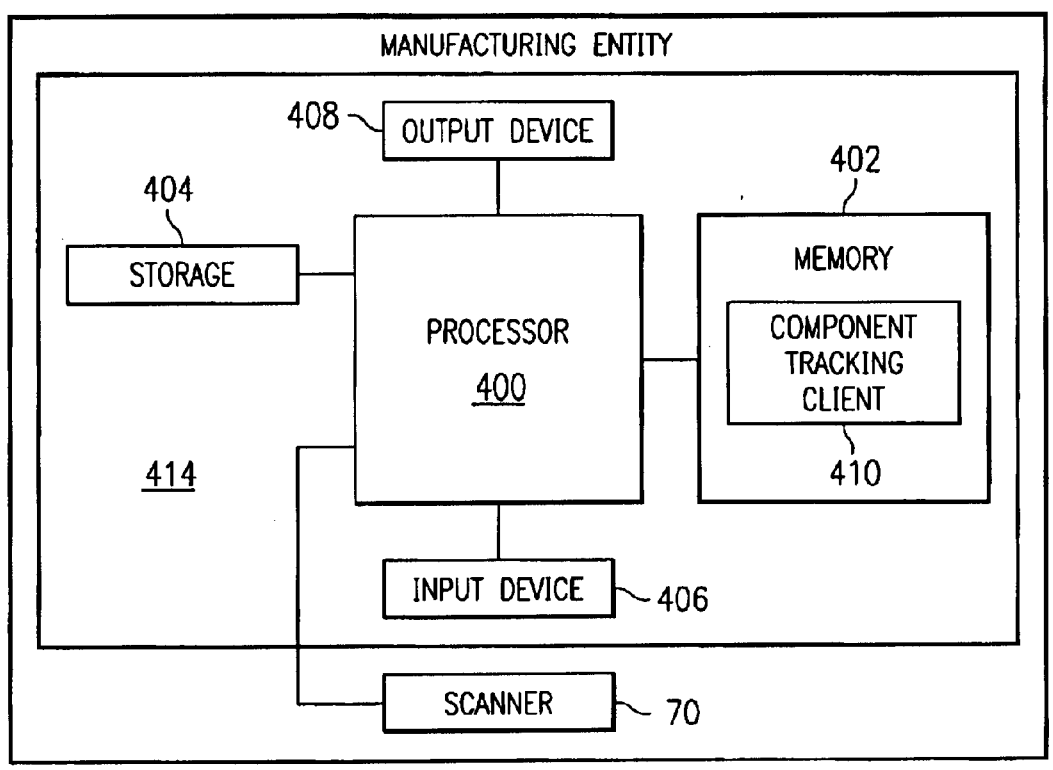
FIG. 1D is a block diagram illustrating portions of the manufacturing entity of FIG. 1A associated with communicating with the component tracking module of FIG. 1C, and is illustrative of other entities of FIG. 1A.

FIG. 1D is a block diagram of portions of an example manufacturing entity 412. Portions of other entities 20 concerning communicating with component tracking module 18 may be formed similarly. In this example, manufacturing entity 412 includes a computer 414 coupled to scanner 70. Scanner 70 may be used to scan bumpy bar code 50 and provide an indication of the identity of the scanned component 16 reflected by bumpy bar code 50 to computer 414. Computer 414 may take any suitable form and in one example comprises a processor 40 coupled to a memory 402 and a storage 404. Computer 414 may also include an input device 406 coupled to processor 400 and an output device 408 coupled to processor 400. Stored within memory 402, or alternatively storage 404 or other suitable location, is a component tracking client application 410. Component tracking client application 410 includes suitable software for performing the functions described herein of manufacturing entity 412 in association with tracking system 10. Memory 402 may comprise a floppy disk, a CD-ROM, flash memory, or other types of memory. Storage 404 may comprise hard disk storage, optical storage, or other types of storage. Input device 406 can take many suitable forms including a keyboard and a pointing device. Output device 408 may take many suitable forms including a display or a printer.

FIG. 2 is a flowchart illustrating a series of example steps provided to illustrate the identification of a suspect component 16 that may be identified as scrap. The scrap designation allows defective components 16 to be identified and targeted for suitable repair or meltdown before proceeding further in the manufacturing process. The operation of the scrap designation unit 48 of tracking system 10 also ensures that defective components 16 are immediately identified and subsequently removed from the manufacturing cycle or otherwise replaced or repaired in scenarios in which the defective component is already being used in an operating system. The acts illustrated in the flow chart of FIG. 2 may be performed by scrap designation unit 48.

The flowchart of FIG. 2 begins at step 200, where a suspect component 16 is identified by a person or an entity 20. This identification may be made after any number of occurrences, such as after an investigation of a suspect component 16, after testing data reveals some deficiency in component 16, or after an incorrect variance is identified, for example. The suspect component 16 is then identified and its corresponding serial number is entered into scrap designation unit 48 of component tracking module 18 at step 202. Alternatively, any suitable parameter or characteristic may be entered into component tracking module 18 such that the suspect component is identified. At step 204, scrap designation unit 48 of component tracking module 18 identifies the suspect component and any other potentially defective components that may have similar negative characteristics based on similar manufacturing process. This may involve accessing component profile 37.

At step 206, the location of the suspect component may be traced and identified from component profile 37 stored in component tracking module 18. From step 206, multiple alternatives may be employed. For example, at step 208 a notification may be automatically generated by scrap designation unit 48 of component tracking module 18 and then communicated to an entity 20 associated with the suspect component. The entity 20 may be using component 16 or otherwise holding the suspect component 16 for potential future use. Alternatively, from step 206 the identity of the entity 20 may be determined by tracking system 10 in order to retrieve contact information associated with a customer or a client. A manufacturing representative or system administrator may then contact the entity associated with the suspect component and offer information relating to the suspect component, as illustrated in step 210. From each of steps 208 and 210, a customer, a client, or an entity associated with the defective component may receive a suitable notification and respond with appropriate remedial actions at step 212. This remedial action may include discontinuing use of the suspect component, or returning the component to a selected one of casting entity 26, machining entity 28, coating entity 30, or warehouse entity 34 for repair or service and/or credit. Where appropriate, fewer, additional, and/or different steps, arrangements, or operations of FIG. 2 may be made without departing from the teachings of tracking system 10.

FIG. 2 illustrates the ability of tracking system 10 to act quickly to recall suspect components 16. Should a component 16 fail a material test or possibly even fail under operating conditions tracking system 10 offers the ability to locate the components and to determine if other related components are similarly defective. If other components 16 received similar manufacturing processes, there is a strong possibility that they too may be vulnerable in some way and therefore can be recalled accordingly. Thus, in accordance with the teachings of the present invention, a pedigree can be obtained by gleaning data and information stored in component tracking module 18 that documents or otherwise catalogs information relating to a component 16 as it moves through the manufacturing process.

Figures 3A, 3B:
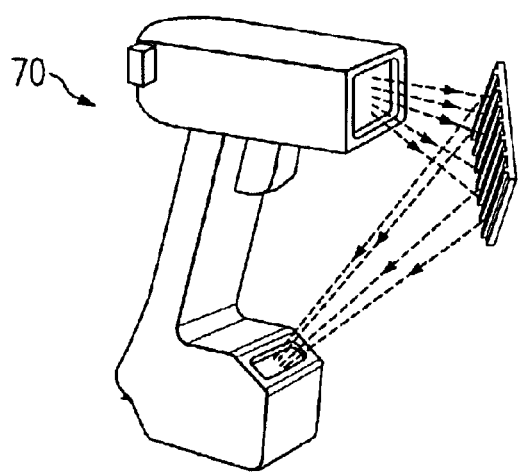
FIG. 3A is a simplified diagram of a serial number for a corresponding bar code to be included on a component to be tracked by the system of FIG. 1 in accordance with one embodiment of the present invention.
FIG. 3B is an example bar code reader that may be used to scan a bar code to be used for tracking a component with the system of FIG. 1 in accordance with one embodiment of the present invention.
Figures 3C, 4A:
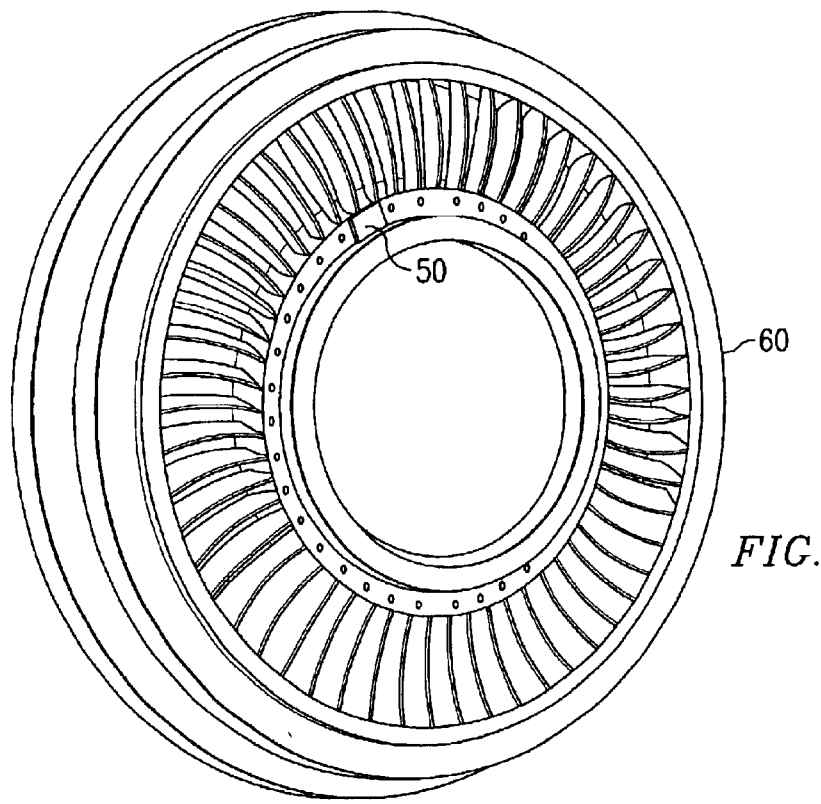
FIG. 3C is a diagrammatic perspective view of an example component that includes a bar code used to track the component using the system of FIG. 1 in accordance with one embodiment of the present invention.
FIG. 4A is a diagram of an example initiation form for creating a serial number to be marked on a component to be tracked by the system of FIG. 1A in accordance with one embodiment of the present invention.

FIG. 3A is a diagram illustrating an example bar code 50 in accordance with a particular embodiment of the present invention. Bar code 50 represents a machine-readable identification tag that is imprinted, stamped, fixed, or otherwise coupled to a component being manufactured and tracked by tracking system 10. Bar coding, also known as universal product coding, offers a computerized inventory control feature by providing a series of vertical bars of varying widths positioned on a component or product that identify the corresponding item. The actual code reflects information by using differences in height, rather than contrast, to distinguish between bars and spaces.

In a particular embodiment of the present invention, bar code 50 is a three-dimensional structure (also known as a bumpy bar code) and offers an identification element for a corresponding component to be tracked by tracking system 10. Bumpy bar code 50 represents a generally permanent feature of an associated component, making mislabeling or erroneous data-entry virtually impossible. Alternatively, bar code 50 may be any other suitable bar code element, such as a two-dimensional bar code storing information via the height and length of the symbols included therein. Bar code 50 may include stacked symbology, or multi-row coding that provides a data-entry feature to bar code 50. Bar code 50 may also represent a linear bar code formation that is embossed on its surface. Bar code 50 may be read or scan using a bar code scanner 70, as described in greater detail below with reference to FIG. 3B.

Bar code 50 may be implemented where printed labels or other fastening tags may not be capable of adherence. Additionally, bar code 50 may be used in hostile or abrasive environments, such as those encountered by turbine components, and maintain its integrity. Bar code 50 may also be painted over or additionally coated and still maintain its operability in providing information associated with each component.

Bar code 50 may represent any suitable data or information relating to the manufacture of a component. An example set of parameters are illustrated in FIG. 3B as being represented by bar code 50. For purposes of example, the 'H' as designated in bar code 50 may be representative of a manufacturing site or location at which the associated component was constructed. In addition, bar code 50 may include indicia or symbology that indicates when the associated component was constructed. This is indicated generally at 'G' where data associated with the month of manufacture is provided. In addition, bar code 50 may offer a year of manufacture, such as that year denoted by a '0.' The '0' indicates that the corresponding component was manufactured in year 2000, for purposes of this example component.

Another piece that may be included in bar code 50 is a sequential serial number. The sequential serial number may be arbitrarily assigned or specifically designated for certain components within a manufacturing enterprise. The sequential serial number may correspond to a parts sheet number which is specific to a given entity. Alternatively, the sequential serial numbers may represent a uniform element that identifies a component in a universal manner to all participants in the manufacturing process. The sequential serial number may be assigned according to any appropriate routine or process such that components may be distinguished from each other.

Bar code 50 may be scribed, implied, stamped, or otherwise formed by a bumpy bar code machine in a particular embodiment of the present invention. A bumpy bar code machine may include two pins. One of the pins may resemble a rod or a pen that forms dots that define human-readable numbers or a representative symbology. The other pin may operate as a chisel or a stylist, providing a wedge that makes that actual bars in bar code 50. The way these pins are designed as well as the positioning of bar code 50 (as described in greater detail below with reference to FIG. 3B) does not affect the strength or stress characteristics of the labeled component, e.g. stress-risers are not created. Stress-risers are points of stress in a material that may potentially result in cracks or failure of the corresponding structure. In a particular embodiment of the present invention, bar code 50 includes rounded bar corners that are less susceptible to encountering sharp points. Sharp points are prone to snagging other components and may operate to break more quickly as a result of the abrasive environment in which they are forced to operate. Alternatively, bar code 50 may be constructed in any suitable manner and positioned in any appropriate location according to particular needs.

FIG. 3B illustrates a bar code scanner 70 in accordance with a particular embodiment of the present invention. Bar code scanner 70 is a hand-held device that may be used by any element or entity within, or external to, tracking system 10. Alternatively, bar code scanner 70 may be a wireless device, a separate scanning system, or any other element or device that operates to scan or to read a bar code or bar code symbology.

In operation, bar code scanner 70 may scan bar code 50 such that a corresponding component may be identified based on its bar code structure. Bumpy bar code readers or scanners may generally read both bumpy and standard black and white bar codes. Bar code scanner 70 may read depth and width between bars versus contrasts of bars. Bar code scanner 70 may be lightweight, inexpensive, and offer a radio frequency capability in wireless environments where appropriate.

Figure 5:
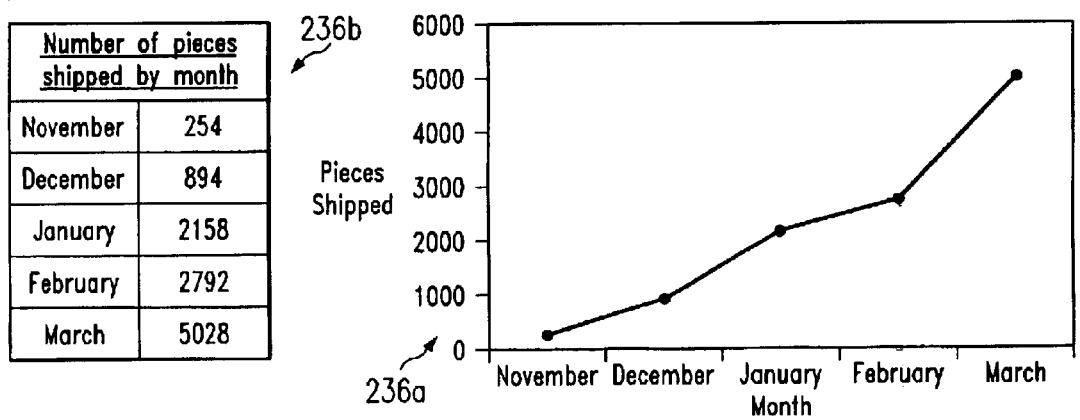
FIG. 5 is a graphical illustration of production cycles associated with components to be tracked by the system of FIG. 1A in accordance with one embodiment of the present invention.

FIG. 3C illustrates an example implementation of bar code 50. In a particular embodiment of the present invention, where a turbine component 60 (or a portion thereof) is being manufactured and tracked by tracking system 10, bar code 50 may be positioned on an inner shroud of turbine component 60 as illustrated in FIG. 5. Alternatively, bar code 50 may be positioned anywhere on or included within turbine component 60 such that information may be gleaned by scanning bar code 50 with a suitable bar code scanner. Bar code 50 may be positioned on turbine component 60 such that it is accessible to scanning operations, while being minimally exposed to excessive heat, wear, or environmental hazards that would break down the three-dimensional structure of bar code 50 in particular embodiments of the present invention.

The positioning of bar code 50 as illustrated in FIG. 3C obviates the need to remove the blade ring (which holds vane segments) in completely disassembling the vane segments or portions of the blade ring in order to access the serial numbers of bar code 50. The flexibility granted by the position of bar code 50 is important because these parts may need to be routinely evaluated in order to diagnose aging and reliability concerns or to identify the amount of hours that each component has worked in an associated system. Accordingly, when the vane segments are positioned in the blade ring, it is beneficial if bar code 50 is not covered. The example location as provided in FIG. 5 illustrates such an embodiment, where easy access may be made to bar code 50.

In addition, the positioning of bar code 50 presents negligible effects for a corresponding component. The placement of bar code 50 generally does not impact or degrade the operation or the structural integrity of a corresponding component. Tracking system 10 also offers the ability to publish printed bar codes via network 14 such that bar code 50 may be printed and coupled to or otherwise fixed to containers or items, thereby enabling error-free receipt of components or parts at a next destination.

FIG. 4A is a diagram of an example initiation form 240 stored in or otherwise associated with initiation unit 40. Form 240 may be used for generating individual serial numbers that identify a corresponding component to be manufactured and then tracked by tracking system 10. Initiation form 240 includes a series of input allocations 240a for: a part name, a part order (PO) number, a PO item, a PO quantity, a requested quantity, a bill of material (B/M) sub number, a casting house serial number, and a style number. These parameters may be any suitable length of characters and correspond to components propagating through the manufacturing process. Form 34, as illustrated generally in FIG. 4A, may be displayed or otherwise accessed through component tracking module 18 or an associated website thereof. Form 240 may be used by casting entity 26 in creating serial numbers to be represented by corresponding bar codes, as described above.

FIG. 4B is a diagram of an example search form 242 stored in or otherwise associated with search unit 42 for searching for a component 16 within tracking system 10 in accordance with one embodiment of the present invention. Form 242 illustrated in FIG. 4B may be accessed via a web page associated with component tracking module 18 by end user 12, casting entity 26, machining entity 28, coating entity 30, warehouse entity 34, or any other suitable element wishing to find a component 16 using tracking system 10. Search form 242 is illustrated in FIG. 1A as being used by end user 12, as an example. Search form 242 includes an example search format in which a type 242a of component 16 may be selected and a corresponding purchase order number 242b input into form 242 such that a component 16 is searched based on the input information. A component 16 may be tracked by any suitable parameter or characteristic that provides some distinction from one component to the next. These distinctions may include a PO item, a PO number, a type of component, a location of manufacture for the component, a date of manufacture for the component, or a sequential serial number of the component, for example.

The search capability of search unit 42 in component tracking module 18 offers a number of important benefits. For example, customer service may be greatly improved with the implementation of the form illustrated in FIG. 4B. The form allows clients or consumers to search component tracking module 18 for specific products, which may be designed and manufactured with designated parameters for distinct applications. Thus a client or customer could use the searching function to identify exact matches in product specifications needed for particular applications.

Figure 4C:
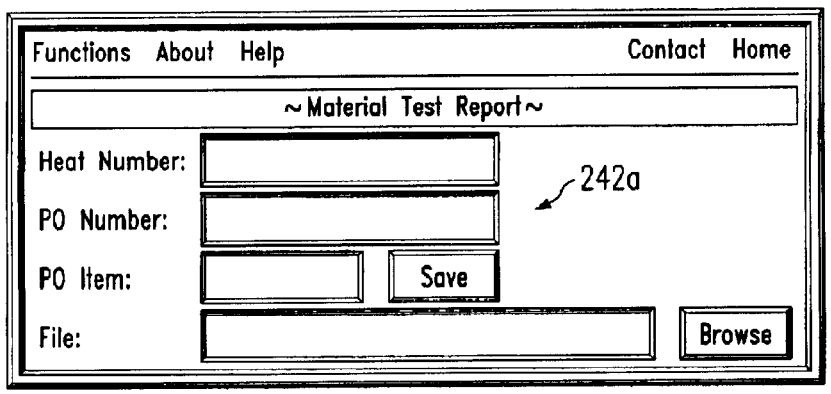
FIG. 4C is a diagram of an example material test report form for a material test report associated with a component to be tracked by the system of FIG. 1 in accordance with one embodiment of the present invention.

FIG. 4C is a diagram of an example material test report form 236 stored in or otherwise associated with profile storing unit 36 in accordance with one embodiment of the present invention. Form 236 is illustrated in FIG. 1A as being used by user 12; however, form 236 may also be used by entities 20, or alternatively the material test report features of the invention may be accessed through other suitable techniques. Material test report form 236 may provide a series of input spaces 242a for identifying a component 16 associated with a material test report. For example, component 16 may be identified by a heat number, a PO number, a PO item, or a file parameter for example. The results entered into material test report form 236 may be added to the component profile 37 stored in profile storing unit 36.

Where a part fails, and such is designated in a material test report form 236, an option may be provided by component tracking module 18 to track other parts that may be potentially manufactured or deficient in the same way. This recall function provides the capability for finding potentially defective components 16 in tracking system 10. A corresponding alert signal may then be communicated to a customer informing him of the potential for a problem or a flaw within a component 16. Remedial measures may include quarantining components 16, shipping defective pieces back to a manufacturing entity 20 for refinement, or scrapping the flawed components 16 where repairs cannot be performed. The tracking of the component may be virtually infinite in being maintained for the lifetime of component 16, continuing to remain with assembled units as well as scrapped components until the corresponding serial number is designated as suitable for retirement.

The material test report form 236 of FIG. 4C offers one way in which data associated with a component 16 may be submitted and stored in tracking system 10. A number of other pieces of component data may also be submitted in accordance with the teachings of the present invention. For example, each entity 20 or participant in the manufacturing process may submit items such as specifications, designs, evaluations or tests, or other associated component parameters to component tracking module 18. Any documentation or data within tracking system 10 may be submitted electronically such as by attachment, for example. The use of electronic documentation avoids the use of hard copies. Hard copies present a significant problem where information is subject to repeated changes and modifications before arriving at an agreed upon solution. Properly maintained and organized documentation may also provide evidence for suspected components in performing a recall function.

FIG. 4D is a diagram illustrating an example update form 244 stored in or otherwise associated with update unit 44 for updating a component 16 that is being tracked by tracking system 10. The update may be provided to track the movement of the identified component 16 or to enter parameters or variances of component 16 that have changed. Update form 244 may be stored in component tracking module 18 and accessed by any person or entity via a website, a webpage, or any other suitable interface provided by component tracking module 18. FIG. 4D illustrates a status bar 244a for indicating what stage or phase component 16 has completed within the manufacturing process. The status may be indicated as complete, or within a certain division of the manufacturing process, such as within casting entity 26, machining entity 28, or coating entity 30, for example. Once the requisite information has been input into the update form 244 illustrated in FIG. 4D by the relevant manufacturing entity 20, an update button 244b may be selected and all input information is entered into component tracking module 18.

FIG. 4D also illustrates a series of space allocations 244c for entering component characteristics in order to search for a component and then update a parameter where appropriate. The space allocations represent data entry blanks for items such as: a PO number, a PO item, a B/M sub-number, a material disposition report (MDR), and an engineering change of manufacturing information (ECMI) allocation. These items offer distinguishing characteristics of a component that may be used by end user 12, casting entity 26, machining entity 28, coating entity 30, or warehouse entity 34 in order to selectively identify or otherwise update the profile of a component within tracking system 10.

FIG. 4E is a diagram illustrating an example shipping form 246 stored in or otherwise associated with shipping information unit 46. Shipping form 246 may be used for shipping a component after an update has been completed. FIG. 4E is similar to FIG. 4D, but alternatively includes a "Ship parts" function allocation 246b that may be clicked in order to initiate a shipped part signal indication to component tracking module 18. The shipped component 16 may then be received by a next entity 20 within the manufacturing process and its corresponding location appropriately updated within component tracking module 18. The shipping function may be performed after each bar code of an associated component is scanned such that its current status is reflected in component tracking module 18. Shipping form 246 may be stored in shipping information unit 46 or alternatively in any location within or external to component tracking module 18 and properly accessed by any person or entity via a website, a webpage, or any other suitable interface provided by component tracking module 18.

FIG. 4F is a diagram illustrating an example defect form 248 stored in or otherwise associated with scrap designation unit 48. Defect form 248 may be used for determining a potential infection of related components 16 revealed by a defect found in a single component 16. An example use by user 12 is illustrated in FIG. 1A. Such a procedure, as illustrated in FIG. 2, may be encoded in a computer-readable medium and stored in any suitable location within or external to component tracking module 18 and accessed by any person or entity via a website, a webpage, or any other suitable interface provided by component tracking module 18. Defect form 248 provides a number of data items such as: PO numbers, shipping dates, store numbers, and suppliers' names. The data items offer a component profile that may be used to glean information about which components may include a defect based on some relationship with an already identified defective component. For example, defects traced back to a single supplier may reveal that an entire batch or group of components 16 include a defect similar to the defect found in the suspect component. This may, for example, allow for component tracking module 18 to identify a series of components 16 that may be potentially defective or otherwise inadequate for continuing operations.

The location of the potentially defective components 16 may then be identified and a suitable corresponding message communicated to a current user or owner of the possibly defective component. An automatic message may be generated by component tracking module 18 in order to indicate that a possible defective component 16 may have been received by a client. Alternatively, component tracking module 18 may simply flag or otherwise identify a potentially defective component and offer contact information for an entity to communicate with the holder of the component. The entity holding or using the potentially defective component may then perform suitable remedial measures on the defective component or simply ship the component back to a selected one of casting entity 26, machining entity 28, coating entity 30, or warehouse entity 34.

FIG. 4F additionally illustrates the ability of tracking system 10 to store information in a component profile within component tracking module 18. In a particular embodiment of the present invention where a component is manufactured for the turbine industry, tracking system 10 may also allow critical engine configuration data to be stored and relayed to a service division within component tracking module 18. The service division may thus be enabled to determine which components are in specific engines and track associated operating hours, system starts and stops, and determine part refurbishment schedules or track component repairs. Tracking system 10 may further maintain component data relating to who performed the work on a component and where the work was performed.

FIG. 4G is a diagram illustrating an example scrap designation form 249 stored in or otherwise associated with scrap designation unit 48. Scrap designation form 249 may be implemented for tracking a component 16 that has been designated for scrap in tracking system 10. An example use of scrap designation form 249 by user 12 is illustrated in FIG. 1A. Scrap designation form 249 further includes a series of suppliers and a corresponding set of parameters related to each component 16 being tracked by tracking system 10. For example, scrap designation form 248 includes the number of pieces received, the time at which they were received, the shipping date, the pieces shipped, the end inventory, and the amount of pieces that were designated as scrap for each company or entity having its profile stored in tracking system 10. Scrap designation form 248 may be stored in any suitable location within scrap designation unit 48 or external to component tracking module 18 and accessed by any person or entity via a website, a webpage, or any other suitable interface provided by component tracking module 18.

The 'pieces scrapped' column 249 illustrates that selected components include some defect, degradation, or deficiency that may prohibit the components 16 from being shipped to a next destination or from being sold to a client or customer. Once designated as scrap, the defective component may be tracked until it is fixed, repaired, or otherwise routed back to a location where it may be melted down into a raw material form. In addition, components designated as 'scrap' may be investigated further in order to determine their current location. Once their location is identified, the component may be retrieved and shipped to a suitable location for proper repair or meltdown in situations where it cannot be fixed. In an event of the undesired situation where a defective component has already been shipped to a customer or client, the client profile stored in component tracking module 18 may be accessed in order to contact a client or a customer that received the item. The client or customer may then be informed of the defect in the component that should have scrapped or discarded. Where defects are discovered after the component has been sold or installed into a system architecture, component tracking module 18 may operate to automatically generate a signal to be communicated to a client or customer informing them of a defective component.

By tracking a defective component all the way back to a scrap facility, numerous errors may be avoided or effectively eliminated. For example, without the benefit of the present invention, defective components can be inadvertently put back into the manufacturing stream. These defective components may produce unsatisfactory results to receiving entities and reflect poorly on the manufacturing entities that produced them. In addition, by tracking a defective component back to a scrap location, proper credit may be received for the defective component in cases where payment was already remitted.

Scrap form 249 further illustrates the ability of tracking system 10 to offer information relating to how to determine the amount of time required for a component to propagate through each manufacturing operation. This time duration may be particular to a supplier or a process in the manufacturing cycle. This allows manufacturing bottlenecks to be identified and further allows an entity to anticipate production cycle times. Additionally, tracking system 10 may provide supplier leads and cycle times that will enable corresponding personnel to determine if a specific supplier has enough capacity to handle more production, or if a similar supplier can perform an operation more quickly.

Scrap form 249 additionally illustrates the ability of an entity to utilize tracking system 10 in managing inventory on a real-time basis. Personnel may view how many parts or components are currently in the pipeline, as well as their expected delivery date. This information provides guidance in forecasting future orders and in managing potential robust or lean times in manufacturing production cycles.

FIG. 5 is a graphical illustration 236a and corresponding table 236b that may be stored in or otherwise associated with profile storing unit 36. FIG. 5 illustrates capacity characteristics for an example manufacturing entity 20 engaged in a manufacturing process that produces a component 16 derived from receipt of status information according to the teachings of the invention. The production tracking capability of profile storing unit 36 resulting in graph 236a and table 236b allows for the identification of bottlenecks and/or capacity parameters for a manufacturing entity 20. This feature may also offer a capacity status for an administrator of the manufacturing process in order to optimize results or to enhance current asset allocations being used to manufacture the component. Graph 236a and table 236b may be stored in any suitable location within or external to component tracking module 18 and accessed by any person or entity via a website, a webpage, or any other suitable interface provided by component tracking module 18.

FIG. 5 further illustrates an example timeline in which a series of months are provided on a horizontal axis along with a series of production output values on a vertical axis, the graph representing a capacity status over a given time period. The values on the vertical axis represent the number of components shipped for each month. As illustrated by graph 236a, the month of March reflects a high demand for components and accordingly may dictate a limited capacity for an associated entity for obligating itself to additional work. Employing that same reasoning, November may indicate that a capacity exists for the associated entity, where only a minimal number of components were produced for that month and thus additional work could be completed. These production cycles may be due to potential bottlenecks in the manufacturing process that should be addressed. Alternatively, these cycles may reflect fluctuating market conditions or cyclic environments that should be anticipated and planned for in the future.

Although several embodiments have been illustrated and described in detail, it will be understood that various substitutions and alterations can be made therein without departing from the teachings of the present invention. For example, although tracking system 10 has been explained in the context of a number of examples associated with the turbine industry, tracking system 10 may be implemented in a number of systems where component information is sought to be stored, organized, and accessed. For example, tracking system 10 may be used in the automotive industry, the aerospace industry, in placing persons in the labor force (where profiles of individual job applicants are stored and tracked and where items such as performance evaluations are stored as applicant profiles), or in any other suitable environment where an element propagates through a series of developmental stages.

Additionally, although tracking system 10 has been described in a network environment, tracking system 10 may be employed in a closed architecture system. Such an architecture may be used internally by a company or an organization engaged in multiple steps of the manufacturing process. These systems may implement hard-wired configurations, or use any suitable networking platform, such as a LAN, WAN, OR VPN to facilitate communications between manufacturing entities.

Also, although component tracking module 18 is illustrated as inclusive of various functional units, these units may be positioned in any suitable location or communicate in any sufficient manner without departing from the scope of the present invention. Moreover, any number of these functional units may be combined where appropriate or provided external to component tracking module 18 according to particular needs. What is more, these functional units may be a single operational unit or divided in any suitable manner such that the features of component tracking module 18 may be adequately implemented in accordance with the teachings of the present invention. Component tracking module 18 has only been illustrated in a particular way in FIG. 1 for purposes of teaching.

In addition, the bar code implemented in conjunction with component tracking module 18 may be substituted with any suitable element or device that operates to uniquely identify a component. The bar coding protocol as described herein is offered only for purposes of teaching, a host of other suitable identification tools may be used without departing from the scope of the present invention. Numerous other changes, substitutions, variations, alterations, and modifications may be suggested to one skilled in the art, and it is intended that the present invention encompass all such changes, substitutions, variations, alterations, and modifications as following within the spirit and scope of the appended claims.

What is claimed is:

1. A method for use in managing manufacturing of a virtual factory comprising:
   receiving at a management location, for a plurality of respective particular components, a request over a network for a serial number to be used in identifying the particular component; and
   for each respective particular component:
      in response to the request, determining a serial number for the particular component; and
      for each of a plurality of independent manufacturing entities, independent from each other and the management location, that operate on the particular component, receiving and storing at the management location from the manufacturing entity, over the network, data indicative of a scanned bumpy bar code affixed on the particular component and data indicating a status of manufacture for the particular component, the scanned bumpy bar code signal being indicative of the determined serial number.

2. The method of claim 1, wherein receiving at the management location data indicating a status of manufacture for the particular component comprises receiving data indicating receipt of the particular component by the manufacturing entity.

3. The method of claim 1, wherein receiving at the management location data indicating a status of manufacture for the particular component comprises receiving data indicating the particular component is to be shipped to one of the other of the plurality of independent manufacturing entities.

4. The method of claim 1, wherein receiving at the management location data indicating a status of manufacture of the particular component comprises receiving data indicating manufacture of the particular component has been completed.

5. The method of claim 2, and further comprising:
   aggregating historical received status information for the plurality of particular components; and
   providing the aggregated historical received status information to a user located remote from the management location for a selected one of the plurality of manufacturing entities.

6. The method of claim 1, and further comprising, for at least one of the particular components and at least one of the independent manufacturing entities, receiving at the management location on the network data indicative of testing performed on the particular component of the independent manufacturing entity in conjunction with the data indicative of the scanned bumpy bar code.

7. The method of claim 1, and further comprising determining, based on the received status data for at least one particular component, the location of the particular component.

8. The method of claim 7, and further comprising transmitting the determined location to a user located remote from the management location.

9. The method of claim 6, wherein the data indicative of testing performed on the particular component comprises a variance of the particular component and further comprising transmitting to at least one of the independent manufacturing entities, the variance of the particular component in association with the serial number for the particular component.

10. The method of claim 9, and further comprising receiving a notification at the management location over the network, from a selected one of the manufacturing entities, to halt further shipping of the particular component in response to the selected one of the manufacturing entities receiving the variance of the particular component in association with the serial number for the particular component.

11. The method of claim 1, and further comprising generating, by the management location, a purchase order for a selected one of the manufacturing entities based on the data indicating a status of manufacture for one or more of the particular products.

12. The method of claim 1, and further comprising determining, by the management location, a capacity for a particular one of the manufacturing entities based on the data indicating a status of manufacture for a plurality of the particular products.

13. The method of claim 1, and further comprising providing access to the management location by the marketing entities via a web site.

14. The method of claim 1, wherein the plurality of respective particular components comprise a turbine component.

15. An apparatus for managing a virtual factory comprising:
   a computer comprising:
      a processor;
      a computer-readable medium; and
      a computer program stored in the computer-readable medium operable, when executed by the processor, to:

receive at a management location, for a plurality of respective particular components, a request over a network for a serial number to be used in identifying the particular component; and for each respective particular component:

in response to the request, determine a serial number for the particular component; and for each of a plurality of independent manufacturing entities, independent from each other and the management location, that operate on the particular component, receive and store at the management location from the manufacturing entity, over the network, data indicative of a scanned bumpy bar code affixed on the particular component and data indicating a status of manufacture for the particular component, the scanned bumpy bar code signal being indicative of the determined serial number.

16. The apparatus of claim 15, wherein the computer program is further operable to receive data indicating receipt of the particular component by the manufacturing entity.

17. The apparatus of claim 15, wherein the computer program in further operable to receive data indicating the particular component is to be shipped to one of the other of the plurality of independent manufacturing entities.

18. The apparatus of claim 15, wherein the computer program is further operable to receive data indicating manufacture of the particular component has been completed.

19. The apparatus of claim 16, wherein the computer program is further operable to:

aggregate historical received status information for the plurality of particular components; and provide the aggregated historical received status information to a user located remote from the management location for a selected one of the plurality of manufacturing entities.

20. The apparatus of claim 15, wherein the computer program is further operable to, for at least one of the particular components and at least one of the independent manufacturing entities, receive at the management location on the network data indicative of testing performed on the particular component of the independent manufacturing entity in conjunction with the data indicative of the scanned bumpy bar code.

21. The apparatus of claim 15, wherein the computer program is further operable to determine, based on the received status data for at least one particular component, the location of the particular component.

22. The apparatus of claim 15, and wherein the computer program is further operable to transmit the determined location to a user located remote from the management location.

23. The apparatus of claim 15, wherein the data indicative of testing performed on the particular component comprises a variance of the particular component and wherein the computer program is further operable to transmit to at least one of the independent manufacturing entities, the variance of the particular component in association with the serial number for the particular component.

24. The apparatus of claim 15, and wherein the computer program is further operable to receive notification over the network, from a selected one of the manufacturing entities, to halt further shipping of the particular component in response to the selected one of the manufacturing entities receiving the variance of the particular component in association with the serial number for the particular component.

25. The apparatus of claim 15, wherein the computer program is further operable to determine a purchase order for a selected one of the manufacturing entities based on the data indicating a status of manufacture for one or more of the particular products.

26. The apparatus of claim 15, wherein the computer program is further operable to determine a capacity for a particular one of the manufacturing entities based on the data indicating a status of manufacture for a plurality of the particular products.

27. The apparatus of claim 15, wherein the computer program is further operable to provide access to the management location by the marketing entities via a web site.

28. The apparatus of claim 15, wherein the plurality of respective particular components comprise a turbine component.

29. Software for managing a virtual factory, the software being embodied in a computer readable medium and operable to:

for each of a plurality of independent manufacturing entities, independent from each other and the processor, to:

receive at the computer from the independent manufacturing entity data indicative of a scanned bumpy bar code affixed on respective components in association with data indicating a status of the manufacture of the respective component; and store the received status of manufacture at the respective component; and the computer program further operable to update the status of manufacture of each particular component based on the received status and provide the status of manufacture of any particular component to any of the manufacturing entities.

30. The software of claim 29, wherein the software is further operable to receive data indicating receipt of the particular component by the manufacturing entity.

31. The software of claim 29, wherein the software in further operable to receive data indicating the particular component is to be shipped to one of the other of the plurality of independent manufacturing entities.

32. The software of claim 29, wherein the software is further operable to receive data indicating manufacture of the particular component has been completed.

33. The software of claim 30, wherein the software is further operable to:

aggregate historical received status information for the plurality of particular components; and provide the aggregated historical received status information to a user located remote from the management location for a selected one of the plurality of manufacturing entities.

34. The software of claim 29, wherein the software is further operable to, for at least one of the particular components and at least one of the independent manufacturing entities, receive at the management location on the network data indicative of testing performed on the particular component of the independent manufacturing entity in conjunction with the data indicative of the scanned bumpy bar code.

35. The software of claim 29, wherein the software is further operable to determine, based on the received status data for at least one particular component, the location of the particular component.

36. The software of claim 29, and wherein the software is further operable to transmit the determined location to a user located remote from the management location.

37. The software of claim 29, wherein the data indicative of testing performed on the particular component comprises a variance of the particular component and wherein the software is further operable to transmit to at least one of the independent manufacturing entities, the variance of the particular component in association with the serial number for the particular component.

38. The software of claim 29, and wherein the software is further operable to receive notification over the network, from a selected one of the manufacturing entities, to halt further shipping of the particular component in response to the selected one of the manufacturing entities receiving the variance of the particular component in association with the serial number for the particular component.

39. The software of claim 29, wherein the software is further operable to determine a purchase order for a selected one of the manufacturing entities based on the data indicating a status of manufacture for one or more of the particular products.

40. The software of claim 29, wherein the software is further operable to determine a capacity for a particular one of the manufacturing entities based on the data indicating a status of manufacture for a plurality of the particular products.

41. The software of claim 29, wherein the software is further operable to provide access to the management location by the marketing entities via a web site.

42. The software of claim 29, wherein the plurality of respective particular components comprise a turbine component.

43. An apparatus for use in managing manufacturing of a virtual factory comprising:
   means for receiving at a management location, for a plurality of respective particular components, a request over a network for a serial number to be used in identifying the particular component; and
   means for determining a serial number for the particular component; for each respective particular component in response to the request, and for each particular component, for each of a plurality of independent manufacturing entities, independent from each other and the management location, that operate on the particular component, and for receiving and storing at the management location from the manufacturing entity, over the network data indicative of a scanned bumpy bar code affixed on the particular component and data indicating a status of manufacture for the particular component, the scanned bumpy bar code signal being indicative of the determined serial number.

* * * * *